United States Patent
Lu et al.

(10) Patent No.: US 8,115,645 B2
(45) Date of Patent: Feb. 14, 2012

(54) THERMAL DETECTION SYSTEM AND DETECTION METHOD THEREOF

(75) Inventors: Chung-Hsien Lu, Jhubei (TW); Hsin-Dar Tang, Miaoli (TW); Shih-Min Tzeng, Tainan (TW); Wu-Chi Ho, Jhudong Township, Hsinchu County (TW); Huei-Shyang You, Taoyuan (TW)

(73) Assignee: Industrial Technology Research Institute, Chutung (TW)

( * ) Notice: Subject to any disclaimer, the term of this patent is extended or adjusted under 35 U.S.C. 154(b) by 296 days.

(21) Appl. No.: 12/370,763

(22) Filed: Feb. 13, 2009

(65) Prior Publication Data

US 2009/0309741 A1    Dec. 17, 2009

(30) Foreign Application Priority Data

Jun. 16, 2008    (TW) ................. 97122467 A

(51) Int. Cl.
*G08B 17/00*    (2006.01)

(52) U.S. Cl. ......... 340/584; 374/120; 374/153; 702/130

(58) Field of Classification Search .................. 340/584, 340/567; 374/120, 153, 154; 702/130, 135
See application file for complete search history.

(56) References Cited

U.S. PATENT DOCUMENTS

| | | | | |
|---|---|---|---|---|
| 4,318,300 | A | * | 3/1982 | Maughmer ................. 73/178 R |
| 5,448,224 | A | * | 9/1995 | Mochizuki ..................... 340/584 |
| 5,877,688 | A | * | 3/1999 | Morinaka et al. ............. 340/584 |
| 2004/0066833 | A1 | * | 4/2004 | Blakeley, III ................. 374/120 |

FOREIGN PATENT DOCUMENTS

CN    201034738    3/2008

* cited by examiner

*Primary Examiner* — Thomas Mullen
(74) *Attorney, Agent, or Firm* — Allen, Dyer, Doppelt, Milbrath & Gilchrist, P.A.

(57) ABSTRACT

A thermal detection method comprises steps of providing a rotation device, disposing a thermal sensor on the rotation device, rotating the rotation device, and using the thermal sensor to detect a temperature of an object without contacting the object. A thermal detecting system comprises a rotation device and a thermal sensor disposed on the rotation device for detecting a temperature of an object without contacting the object.

17 Claims, 4 Drawing Sheets

THERMAL DETECTION SYSTEM AND DETECTION METHOD THEREOF

FIELD OF THE INVENTION

The present invention relates to a thermal detection system and to a thermal detection method thereof.

BACKGROUND OF THE INVENTION

There are plenty of electrical apparatuses and elements inside electrical control cabinets or equipment within factories and buildings. Malfunction of these electrical apparatuses may cause energy to be wasted, accidental fires, and interruption of production lines, etc., due to long-term operation, poor maintenance, and over loading, etc. of the electrical apparatuses. A power failure in a high tech factory can result in a loss of hundreds of thousands or even millions of dollars. The potential loss for the damage to the company's goodwill can be even higher. Moreover, malfunction of these electrical apparatuses may danger human lives. It is better to physically detect and monitor the temperature of the electrical elements inside the electrical control cabinets or equipment. However, the space inside the electrical control cabinets and equipment is small, and there is no available technique or product to meet the demand for real-time monitoring of the electrical elements inside a small space. Alternatively, thermal imaging cameras that cost more than ten thousand U.S. dollars are used for semiannual or annual inspections instead. These inspections require much time and effort. Furthermore, the problems of accidental fires, interruptions of the production line, etc. may still occur in the duration between inspections. The risk still can not be effectively lowered.

As technology is continuously being improved, production equipment becomes more and more precise, complex, huge and expensive. Losses due to the above-mentioned risks become larger than ever, especially for high tech industries, such as semiconductor and optoelectronics industries. Therefore, a solution that is effective and at a reasonable cost for the above-mentioned problems is required, and can contribute to risk and security management for enterprises and industries.

In order to eliminate the problems and drawbacks of the conventional techniques, new concepts and the solutions are proposed in the present invention so as to effectively and economically solve the above-mentioned problems. The present invention is described below.

SUMMARY OF THE INVENTION

The present invention provides a method and a system for detecting and monitoring the temperatures of object without contact.

In accordance with one aspect of the present invention, a thermal detection method is provided. The thermal detection method comprises steps of providing a rotation device, disposing a thermal sensor on the rotation device, rotating the rotation device, and using the thermal sensor to detect a temperature of an object without contacting the object.

Preferably, the thermal detection method further comprises steps of providing a signal processing circuit electrically coupled to the thermal sensor, and using the signal processing circuit to transform an electronic signal to a digital signal, wherein the electronic signal corresponds to the temperature detected by the thermal sensor.

Preferably, the thermal detection method further comprises steps of providing a control unit electrically coupled to the signal processing circuit and the rotation device, and using the control unit to receive the digital signal from the signal processing circuit and to control the rotation device.

Preferably, the thermal detection method further comprises steps of providing a processor electrically coupled to the control unit, setting a temperature threshold, and using the processor to compare the temperature threshold with the temperature detected by the thermal sensor.

Preferably, the thermal detection method further comprises steps of providing an alarm electrically coupled to the processor, and using the processor to decide whether to enable the alarm or not based on a comparison result of the temperature threshold and the temperature detected by the thermal sensor.

Preferably, the thermal detection method further comprises a step of storing a value of the temperature in a storage device.

Preferably, the thermal detection method further comprises steps of analyzing the value of the temperature stored in the storage device by an analysis method, and deciding whether to adjust the temperature threshold or not based on the analyzed result.

Preferably, the thermal sensor is one of a thermopile and an infrared sensor.

In accordance with another aspect of the present invention, here another thermal detection method is provided. The thermal detection method comprises steps of providing a rotation device, disposing a thermal sensor on the rotation device, rotating the rotation device, and using the thermal sensor to detect a temperature of an object without contacting the object.

In accordance with a further aspect of the present invention, a thermal detection system is provided. The thermal detection system comprises a rotation device and a thermal sensor disposed on the rotation device for detecting a temperature of an object without contacting the object.

Preferably, the thermal detection system further comprises a signal processing circuit electrically coupled to the thermal sensor, and transforming an electronic signal to a digital signal, wherein the electronic signal corresponds to the temperature detected by the thermal sensor.

Preferably, the thermal detection system further comprises a control unit electrically coupled to the signal processing circuit and the rotation device, wherein the control unit receives the digital signal from the signal processing circuit and controls the rotation device.

Preferably, the thermal detection system further comprises a processor electrically coupled to the control unit for processing the digital signal.

Preferably, the control unit is electrically coupled to the processor by one of a wireless and a wire electrically coupling method.

Preferably, the processor is one selected from a group consisting of a microprocessor, a computer, a digital signal processor and a general processor.

Preferably, the thermal detection system further comprises an alarm electrically coupled to the processor.

Preferably, the processor compares a temperature threshold with the temperature detected by the thermal sensor, and decides whether to enable the alarm or not based on a comparison result of the temperature threshold and the temperature detected by the thermal sensor.

Preferably, the thermal detection system further comprises a storage device for storing a value of the temperature detected by the thermal sensor, wherein the thermal sensor is one of a thermopile and an infrared sensor.

Preferably, the thermal detection system further comprises at least two other thermal sensors disposed on the rotation device, wherein the rotation device has a rotation center, and a distribution of the thermal sensors is denser at a first region far away from the rotation center than at a second region near the rotation center.

Preferably, the rotation device has a rotation center, and a detection direction of the thermal sensor is one selected from a group consisting of a parallel, an outward and an inward direction to an axis of the rotation center.

The above objects and advantages of the present invention will become more readily apparent to those of ordinary skill in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only. They are not intended to be exhaustive or to be limited to the precise form disclosed.

First Embodiment

Figure 1:
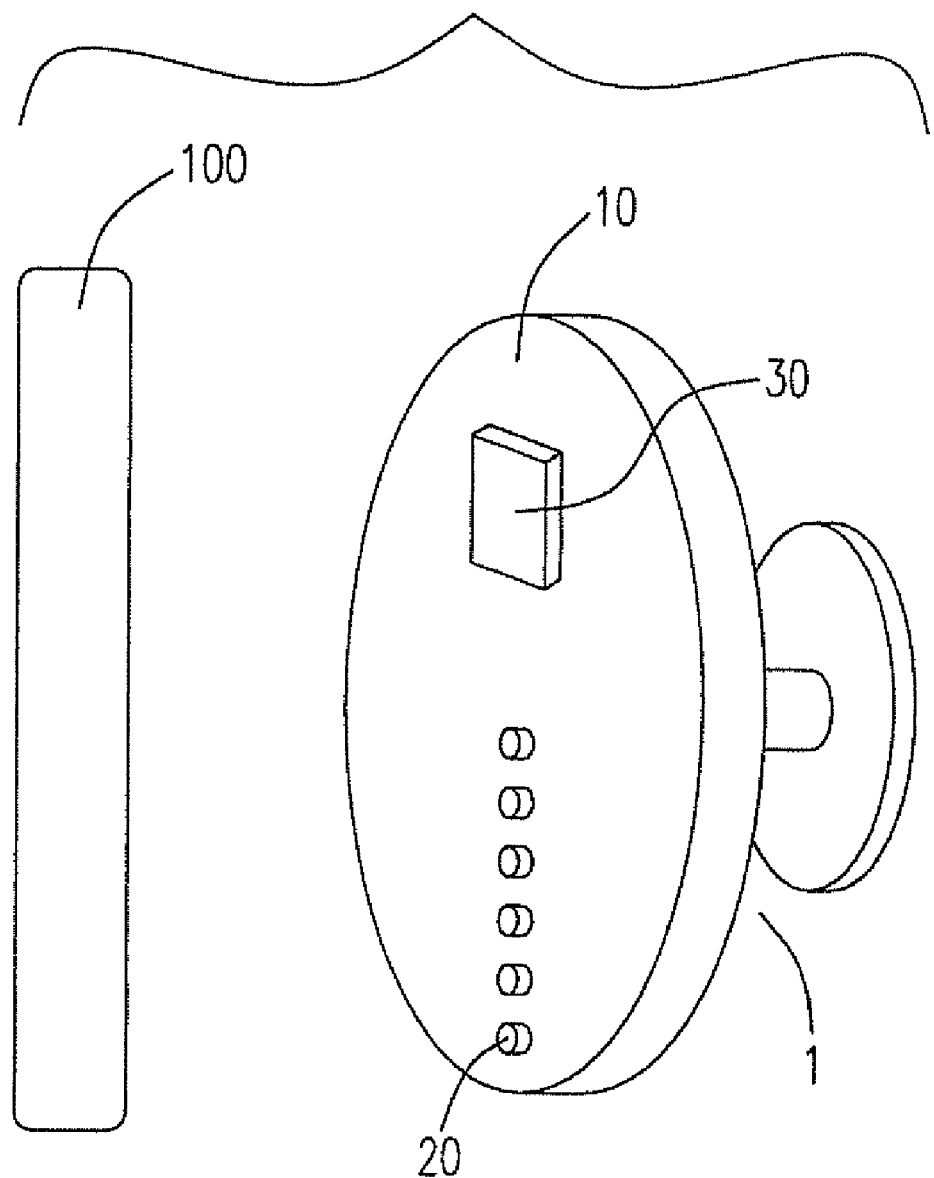
FIG. 1 is a schematic diagram showing the thermal detection system according to a first embodiment of the present invention.

Please refer to FIG. 1, which is the schematic diagram showing the thermal detection system according to the first embodiment of the present invention. The thermal sensors 20 are located on the rotation device 10, and are used to detect the object 100 through a non-contact way, i.e., detecting the temperature of the object 100 without physically contacting the object 100.

Thermopiles, infrared sensors, or other non-contact type thermal sensors can be chosen as the thermal sensors 20 in this embodiment. As shown in FIG. 1, the rotating portion of the rotation device 10 of the present embodiment has a circular shape. In addition, the shape of the rotation device 10 can be a rod-like or other rotatable shape. However, the preferred shape of the rotating portion of the rotation device 10 is symmetrical with respect to the rotating center, or the mass center of the rotating portion. The preferred location of the thermal sensors 20 is on a rotating centerline in order to increase the lifetime of the rotation device. That is, it is better to affect the rotation balance so as to eliminate shaking during the rotation. As to the rotation frequency, this can be adjusted accordingly.

The thermal sensors 20 can be disposed along the radial direction on the rotation device 10. The number of disposed thermal sensors 20 can be adjusted depending on the correlation between the temperature and the position of the sensors to that of the object 100. Since the area of the radial unit segment in the inner circle is smaller than that in the outer circle, distribution of the thermal sensors 20 can be designed to be denser at the region far away from the center than that near the center in order to provide the required precision of the thermal sensors 20.

The object 100 in the present embodiment can be an electrical control cabinet, production lines, equipment, or an apparatus requiring temperature control.

In this embodiment, since the rotation device 10 is rotating, the detection area of the thermal sensors 20 is greatly expanded. A small number of thermal sensors 20 is able to achieve real-time detection and monitoring of temperatures over a very large area. Therefore, it is unnecessary to densely provide a large number of thermal sensors 20 covering the whole area for temperature detection and monitoring. Accordingly, the cost of the temperature detection system can be significantly reduced. From the above description, the present embodiment can effectively and economically prevent serious problems, such as accidental fires, interruption of production lines, etc. caused by the abnormal temperatures.

Second Embodiment

Figure 2:
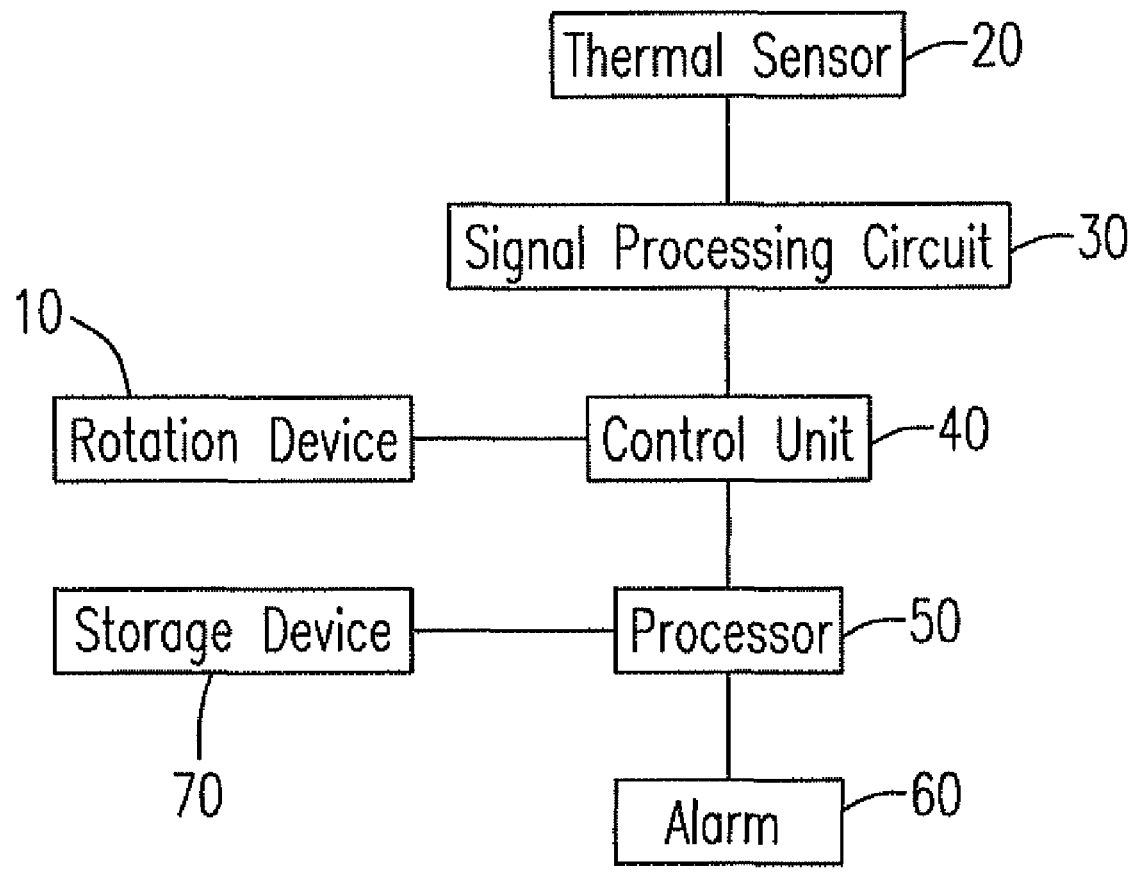
FIG. 2 is a schematic diagram showing electrical connections between elements of the thermal detection system according to a second embodiment of the present invention.

Please refer to FIG. 2, which is the schematic diagram showing the electrical connections between the elements of the thermal detection system according to the second embodiment of the present invention. In the thermal detection system 2 of the present embodiment, the signal processing circuit 30 is electrically connected to the thermal sensor 20, and is able to transform an electronic signal, which corresponds to the temperature detected by the thermal sensor 20, to a digital signal so as to facilitate further control.

The control unit 40 is electrically connected to the signal processing signal 30 and the rotation device 10. The control unit 40 can receive the digital signal from the signal processing circuit 30, and can control the rotation of the rotation device 10, e.g., rotating speed and rotating direction. The control unit 40 is electrically coupled to the processor 50 through a wire connection or a wireless connection by means of a wireless communication device, e.g., radio frequency (RF), Bluetooth™, or other wireless communication protocols in various frequency bands. Therefore, remote control and monitoring of the temperatures can be successfully implemented to facilitate more complicated treatments and controls. The processor 50 in the present embodiment can be a microprocessor, a personal computer, an industrial computer, a work station, a digital signal processor, a general processor, etc. The processor 50 can handle further treatment or processing on the digital signal received by control unit 40, such as storage, operation, statistical calculations, analysis and judgment.

In addition, the processor 50 can be electrically connected to the alarm 60. When the thermal sensor 20 detects an abnormal temperature, the processor 50 can enable the alarm 60 to send out the alarm siren, alarm signals, warning broadcast, etc. so as to prevent a disaster from happening or to reduce the potential for damage or loss as much as possible.

Third Embodiment

Figure 3A:
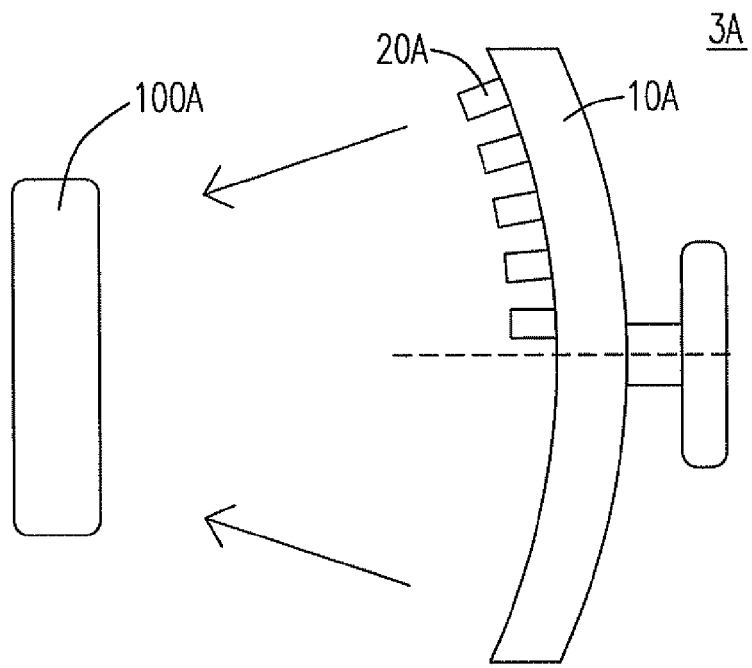
FIGS. 3A and 3B are schematic diagrams showing the thermal detection system according to a third embodiment of the present invention.
Figure 3B:
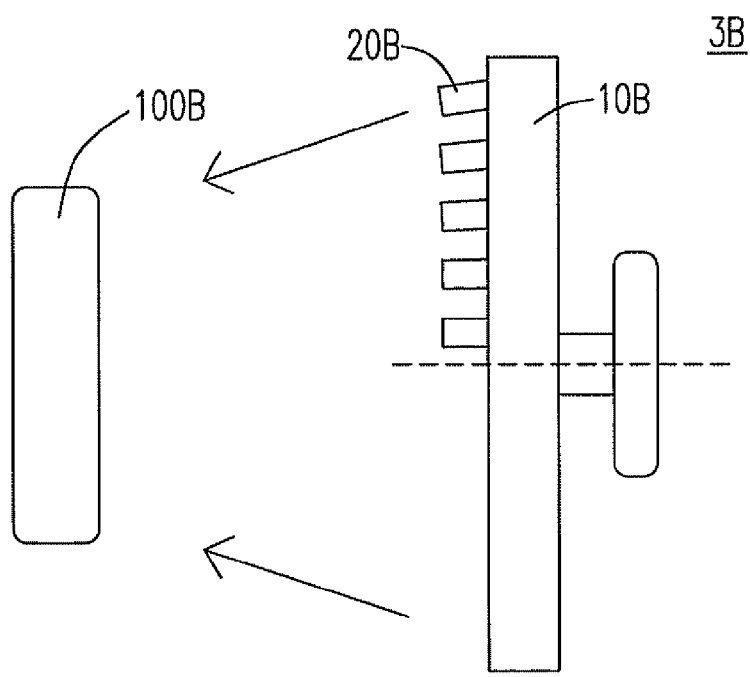

FIGS. 3A and 3B are schematic diagrams showing the thermal detection system according to the third embodiment of the present invention. Please refer to FIG. 3A. In the thermal detection system 3A of the present embodiment, the thermal sensors 20A are disposed on the rotation device 10A, whose rotation plate is centrally concave with a curved shape from a side view. Thus, thermal sensors 20A are focused on the object 100A for highly precise temperature detection and monitoring in the present embodiment.

The focus effect of this type of design can also be available by adopting the design of the thermal detection system 3B shown in FIG. 3B. The thermal sensors 20B are disposed on a rotating plane of the rotation device 10B. The thermal sensors 20B on the outer region of the plane of the rotation device 10B are disposed with the larger inward tilt angle, while the thermal sensors 20B on the inner region of the plane of the rotation device 10B are disposed with the smaller inward tilt angle. Accordingly, the same focus effect for the design in FIG. 3A can be achieved for the design in FIG. 3B.

Fourth Embodiment

Figure 4A:
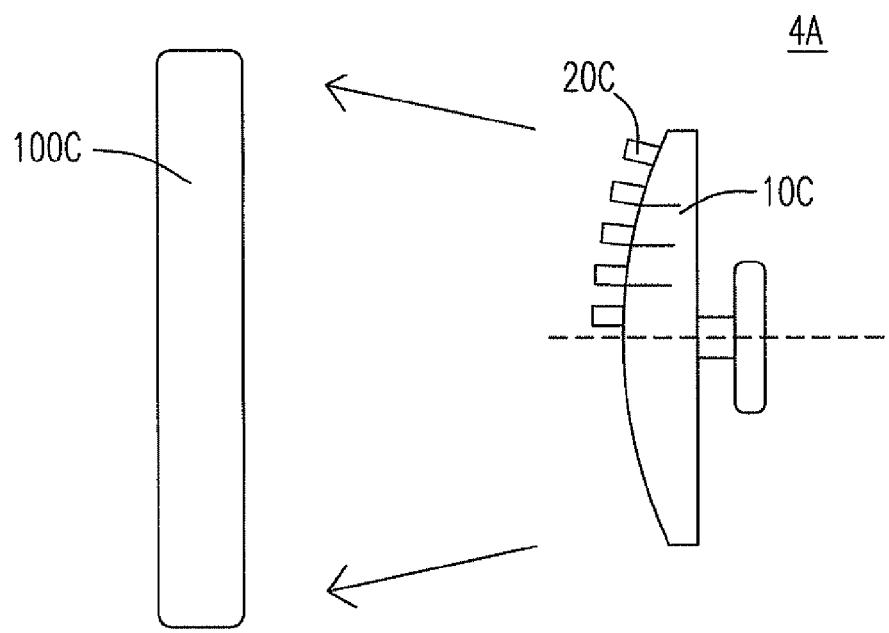
FIGS. 4A and 4B are schematic diagrams showing the thermal detection system according to a fourth embodiment of the present invention.
Figure 4B:
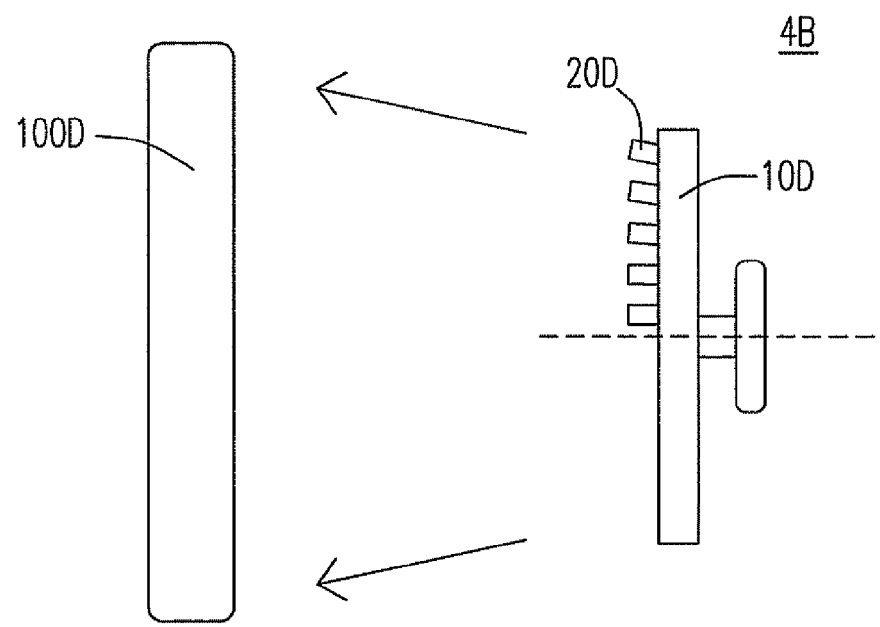

FIGS. 4A and 4B are the schematic diagrams showing the thermal detection system according to the fourth embodiment of the present invention. Please refer to FIG. 4A. In the thermal detection system 4A of the present embodiment, the thermal sensors 20C are disposed on the rotation device 10C, whose rotation plate is centrally convex with a curve shape from the side view. Thus, the detection area of the thermal sensors 20C is expanded. The temperature of object 100C with the larger area can be detected and monitored by thermal sensors 20C.

The function of enlarging the detection area for this type of design can also be available by adopting the design of the thermal detection system 4B shown in FIG. 4B. The thermal sensors 20D are disposed on a plane of the rotation device 10D. The thermal sensors 20D on the outer region of the plane of the rotation device 10D are disposed with the larger outward tilt angle, while the thermal sensors 20D on the inner region of the plane of the rotation device 10D are disposed with the smaller outward tilt angle. Accordingly, the same effect of enlarging the detection area as that for the design in FIG. 4A can be achieved for the design in FIG. 4B. In conclusion, the thermal detection systems in FIGS. 4A and 4B in the present embodiment occupy a small area, but have the capability of detecting temperature over a large area.

Fifth Embodiment

A thermal detection method provided in this embodiment can be applied to the thermal detection systems described in the above first to fourth embodiments or other thermal detection systems. Please refer to FIGS. 1 and 2. In this embodiment, at first the rotation device 10 is provided, the thermal sensors 20 are disposed on the rotation device 10, the rotation device 10 starts to rotate, and the thermal sensors 20 detect the temperature of the object 100 by a non-contact method, i.e. to detect the temperature of the object 100 without physically contacting the object 100.

Since the rotation device 10 is rotating, the detection area of the thermal sensors 20 is greatly expanded. That is, real-time temperature detection and monitoring for a large area can be achieved by using a small quantity of thermal sensors 20. A very large quantity of thermal sensors for covering the whole detected area are no longer necessary. Therefore, the cost of the thermal detection system can be greatly reduced.

The method of the present embodiment can further include the following optional steps: electrically connecting the signal processing circuit 30 to thermal sensor 20, using a signal processing circuit 30 to transform the electronic signal, which corresponds to the temperature detected by thermal sensor 20, to the digital signal for facilitating further control.

In addition, in this embodiment, the control unit 40 can be used and electrically connected to the signal processing circuit 30 and/or the rotation device 10. The control unit 40 can receive the digital signal from the signal processing circuit 30, and can control the rotation device 10, e.g., adjusting the rotation speed or rotation direction, or even performing the programmable control.

Furthermore, in this embodiment, the processor 50 can be used and electrically connected to the control unit 40. A temperature threshold can be set in the processor 50, and this temperature threshold can be compared with the temperature detected by thermal sensor 20. For instance, when the detected temperature exceeds the temperature threshold, then the sign, "High Temperature", is displayed.

Besides, the processor 50 can save the digital signal, which corresponds to the temperature detected by the thermal sensor 20, into the storage device 70, e.g., a hard disk, a portable disk, a CD, a DVD, a tape, etc.

The processor 50 is also capable of executing the calculation and analysis for the detected temperatures during short, middle or long terms, e.g., moving average values, moving average curves and standard deviations for the short, middle or long terms. These analyzed results can be used to judge whether the detected object or the detection system itself needs to be calibrated or rectified, or whether some components of the detected object are aged. In addition, the analyzed data can also be utilized to fine-tune the temperature threshold so as to provide a more effective and smarter control and monitoring. Moreover, two or more temperature thresholds can be used and set as well. For example, the upper and lower temperature thresholds are set, and the detected temperature beyond this temperature range is treated as an abnormal temperature.

In addition, the processor 50 can be electrically connected to the alarm 60. When the detected temperature is abnormal, the processor 50 can enable the alarm 60 to send out the alarm siren, alarm signals, warning broadcast, etc. in order to prevent a disaster from happening or to reduce damage or loss as much as possible.

In conclusion, the present invention provides a thermal detection system and a method thereof, and is able to effectively and economically perform a real-time temperature detection or even smart control and monitoring for a large detected area so as to prevent problems, such as accidental fires, production line interruptions, economic loss and danger to public safety due to very high temperatures. Therefore, the present invention can benefit industries, enterprises, or even the general public.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A thermal detection method, comprising steps of:
providing a rotation device;
disposing a thermal sensor on the rotation device;
providing a signal processing circuit electrically coupled to the thermal sensor;
using the signal processing circuit to transform an electronic signal to a digital signal, wherein the electronic signal corresponds to the temperature detected by the thermal sensor;
providing a control unit electrically coupled to the signal processing circuit and the rotation device;
rotating the rotation device;

using the control unit to receive the digital signal from the signal processing circuit and to control the rotation device; and using the thermal sensor to detect a temperature of an object without contacting the object.

2. A method according to claim 1, further comprising steps of:

providing a processor electrically coupled to the control unit;

setting a temperature threshold; and using the processor to compare the temperature threshold with the temperature detected by the thermal sensor.

3. A method according to claim 2, further comprising steps of:

providing an alarm electrically coupled to the processor; and using the processor to decide whether to enable the alarm or not based on a comparison result of the temperature threshold and the temperature detected by the thermal sensor.

4. A method according to claim 2, further comprising a step of storing a value of the temperature in a storage device.

5. A method according to claim 4, further comprising steps of:

analyzing the value of the temperature stored in the storage device; and deciding whether to adjust the temperature threshold or not based on the analyzed value.

6. A method according to claim 1, wherein the thermal sensor is one of a thermopile and an infrared sensor.

7. A thermal detection system, comprising:

a rotation device;

a thermal sensor disposed on the rotation device for detecting a temperature of an object without contacting the object;

a signal processing circuit electrically coupled to the thermal sensor, and transforming an electronic signal to a digital signal, wherein the electronic signal corresponds to the temperature detected by the thermal sensor; and a control unit electrically coupled to the signal processing circuit and the rotation device, wherein the control unit receives the digital signal from the signal processing circuit and controls the rotation device.

8. A system according to claim 7, further comprising a processor electrically coupled to the control unit for processing the digital signal.

9. A system according to claim 8, wherein the control unit is electrically coupled to the processor.

10. A system according to claim 8, wherein the processor is one selected from a group consisting of a microprocessor, a computer, a digital signal processor and a general processor.

11. A system according to claim 8, further comprising an alarm electrically coupled to the processor.

12. A system according to claim 11, wherein the processor compares a temperature threshold with the temperature detected by the thermal sensor, and decides whether to enable the alarm or not based on a comparison result of the temperature threshold and the temperature detected by the thermal sensor.

13. A system according to claim 7, further comprising a storage device for storing a value of the temperature detected by the thermal sensor, wherein the thermal sensor is one of a thermopile and an infrared sensor.

14. A system according to claim 7, further comprising at least two other thermal sensors disposed on the rotation device, wherein the rotation device has a rotation center, and a distribution of the thermal sensors is denser at a first region far away from the rotation center than at a second region near the rotation center.

15. A system according to claim 7, wherein the rotation device has a rotation axis, and the thermal sensor has a detection direction being one selected from a group consisting of a direction parallel to the rotation axis, a direction tilted inwardly toward the rotation axis, and a direction tilted outwardly away from the rotation axis.

16. A thermal detection system, comprising:

a rotation device;

a thermal sensor disposed on the rotation device for detecting a temperature of an object without contacting the object; and at least two other thermal sensors disposed on the rotation device, wherein the rotation device has a rotation center, and a distribution of the thermal sensors is denser at a first region far away from the rotation center than at a second region near the rotation center.

17. A thermal detection system, comprising:

a rotation device having a rotation axis; and a thermal sensor having a detection direction approximately parallel to the rotation axis, and disposed on the rotation device for detecting a temperature of an object without contacting the object.

* * * * *